(12) United States Patent
Ferrigno et al.

(10) Patent No.: US 8,060,888 B2
(45) Date of Patent: Nov. 15, 2011

(54) MESSAGING INTERFACE SYSTEM FOR CUSTOMER CARE

(75) Inventors: Francesco Ferrigno, Milan (IT); Angelo D'Amora, Rome (IT)

(73) Assignee: Accenture Global Services Limited, Dublin (IE)

( * ) Notice: Subject to any disclaimer, the term of this patent is extended or adjusted under 35 U.S.C. 154(b) by 1098 days.

(21) Appl. No.: 11/900,542

(22) Filed: Sep. 12, 2007

(65) Prior Publication Data
US 2009/0019455 A1    Jan. 15, 2009

(30) Foreign Application Priority Data

Jul. 12, 2007    (EP) .................................... 07425430

(51) Int. Cl.
G06F 3/00    (2006.01)
G06F 9/44    (2006.01)
G06F 9/46    (2006.01)
G06F 13/00   (2006.01)

(52) U.S. Cl. ...................................................... 719/316
(58) Field of Classification Search .................... 719/316
See application file for complete search history.

(56) References Cited

U.S. PATENT DOCUMENTS

| | | | |
|---|---|---|---|
| 6,978,273 B1 | 12/2005 | Bonneau et al. | |
| 6,996,589 B1 | 2/2006 | Jayaram et al. | |
| 7,146,614 B1 * | 12/2006 | Nikols et al. | 719/313 |
| 2003/0233439 A1 | 12/2003 | Stone et al. | |
| 2004/0044987 A1 | 3/2004 | Kompalli et al. | |
| 2004/0133487 A1 * | 7/2004 | Hanagan et al. | 705/34 |
| 2006/0004725 A1 | 1/2006 | Abraido-Fandino | |
| 2006/0026011 A1 | 2/2006 | Verego et al. | |
| 2007/0198987 A1 | 8/2007 | Bottger et al. | |
| 2007/0220497 A1 | 9/2007 | Chudukatil et al. | |
| 2008/0046874 A1 | 2/2008 | Kostoulas et al. | |

FOREIGN PATENT DOCUMENTS

EP    1 411 446 A1    4/2004

OTHER PUBLICATIONS

David C.F. Yen et al., The Impact and Implementations of XML on Business-to-Business Commerce, Computer Standards & Interfaces 24, pp. 347-362, 2002.
Novell, DirXML Administration Guide, DIRXML 1.0 Documentation, [Online] Nov. 2000, pp. 1-104, http://www.novell.com/documentation/kirxmll0/pdfdoc/dirxml/dirxml.pdf.
Novell, Novelll DirXML Administration Guide, DIRXML 1.1 Documentation, Jan. 2002, pp. 1-224, http://www.directory-info.com/DirXML/dirxmlAdmin.pdf.
Novell, Introduction to DirXML, Novell Tutorial, http//developer.novell.com/education/tutorials/introduction, pp. 1-116, 2002.

* cited by examiner

*Primary Examiner* — Andy Ho
*Assistant Examiner* — Timothy A Mudrick
(74) *Attorney, Agent, or Firm* — Brinks Hofer Gilson & Lione

(57) ABSTRACT

A system is disclosed for serving a message to a target system. A database message is converted to a common data model to conform to at least two systems and an architecture of the target system. The common data model is transformed into a specified data type of the architecture of the target system. Calls are managed using specified functions available through an application programming interface offered by the architecture of the target system. Functions of the application programming interface are invoked to implement a target message in the architecture of the target system. The message is written to the target system.

11 Claims, 5 Drawing Sheets

MESSAGING INTERFACE SYSTEM FOR CUSTOMER CARE

PRIORITY CLAIM

This application claims the benefit of EPO Application No. 07 425 430.1, filed Jul. 12, 2007, which is incorporated herein by reference in its entirety.

TECHNICAL FIELD

Generally a method and system is disclosed for serving a message to a target system.

BACKGROUND

Telecommunication providers may maintain information in catalogues regarding the products and services offered by or through the provider. The catalogues may be used to compile information that describes varying aspects of the products and the services. Configuration of the catalogues is often performed manually through a user interface for each application that may require the information.

BRIEF SUMMARY

A system and method, generally referred to as a system, are disclosed for serving a message to a target system. A database message is converted to a common data model to conform to at least two systems and an architecture of the target system. The common data model is transformed into a specified data type of the architecture of the target system. Calls are managed using specified functions available through an application programming interface offered by the architecture of the target system. Functions of the application programming interface are invoked to implement a target message in the architecture of the target system. The message is written to the target system.

Other systems, methods, tools, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

A messaging interface system may automate product and service catalogue information to a customer care system. The messaging interface system may help to automate the configuration of the product and services catalogue. The product and service catalogue may include product family, products and product attributes, services and service attributes, billing tariffs, rating tariffs, bundles, packages, contracts, promotions, and discounts in a customer relationship management system. The messaging interface system may also enable an external source of data to be fed which could act as a centralized product and service catalogue external to specific application systems or a spreadsheet containing all the information required. Accordingly, it is possible to achieve a more efficient serving of messages to a target system in particular independently of possible differences in configuration and/or architecture. Furthermore, the system and method allow for an improved and more efficient man-machine interaction.

Figure 1:
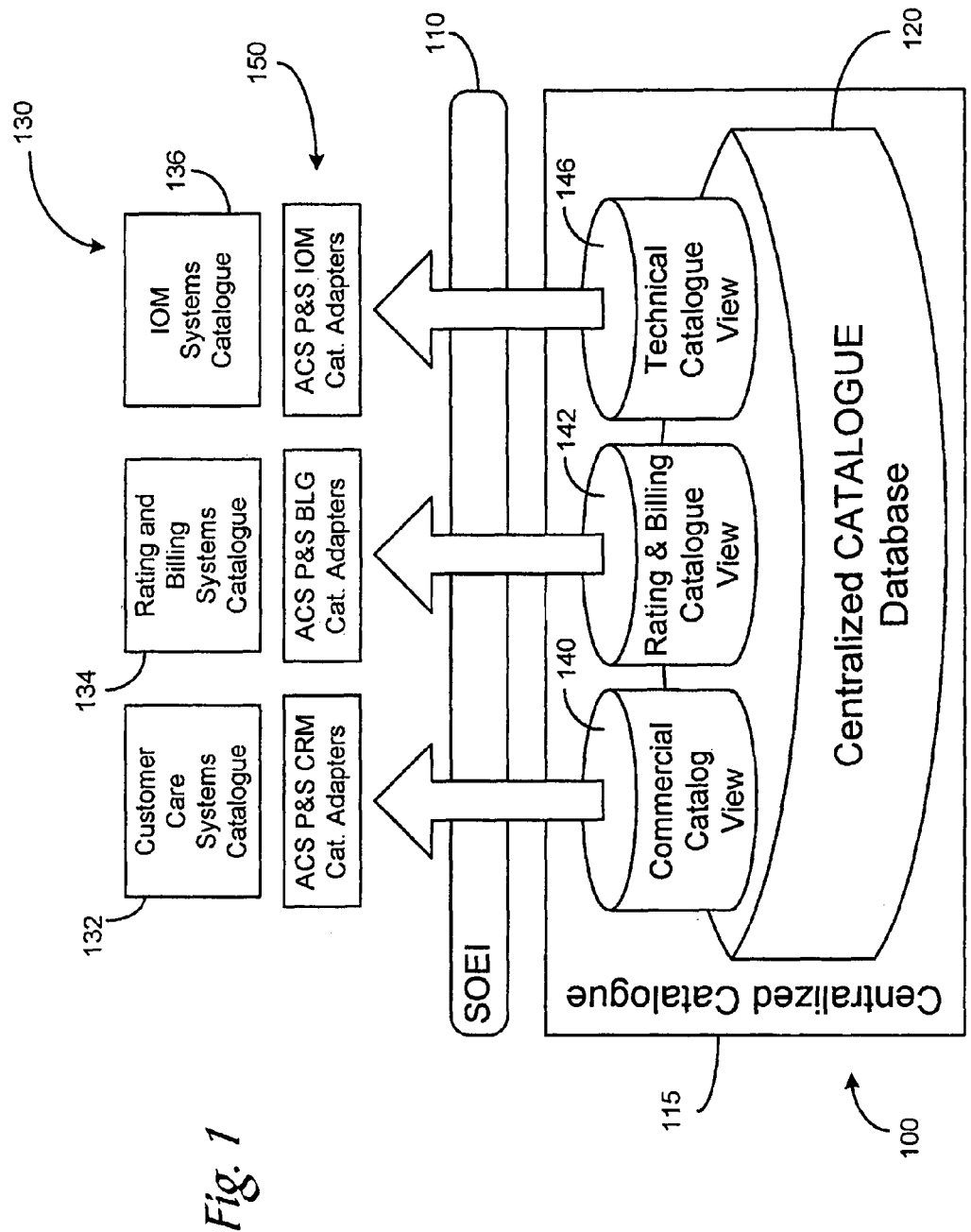
FIG. 1 is a block diagram of messaging interface system.

FIG. 1 is a block diagram of a messaging interface system 100. The messaging interface system 100 may be implemented as an independent processing system or in other manners. For example, the messaging interface system may be implemented as hardware, firmware and/or software integrated with a customer care management system, a billing system, or other systems in a communications architecture. For example, the messaging interface system 100 may implemented as code stored in memory and executed on a processor. As another example, the messaging interface may be implemented as an extension to a messaging protocol processing layer, e.g., a message adaptation layer or message transport layer, within or external to the customer care management system or billing system.

The messaging interface system 100 may include a Service Oriented Enterprise Interface (SOEI) 110 to connect a centralized catalog 115 to system catalogs 130. The message interface 110 may be configurable and invoked remotely or locally to obtain data from the centralized catalog 115. The centralized catalog 115 may include a database 120. The database 120 may be centralized or distributed. The system catalogs 130 may include a customer care system catalog 132, a rating and billing system catalog 134, and an IOM system catalog 136, also referred to as target databases. The centralized catalog 115 may include a commercial catalog view 140 corresponding to the customer care systems catalog 132, a rating and billing catalog 142 corresponding to the rating and billing systems catalog 134, and a technical catalog view 146 related to an IOM system catalog 136.

Adapters 150 may be used to accommodate transfer of information from the different catalog views 140, 142 and 146 (e.g., an extract from the centralized catalog tailored for a specific system application domain) to the related system catalogs 132, 134, and 136. The adapters 150 may include a plurality of adapters, such as one for each catalog view 140, 142, 146. The adapters 150 may allow data of different formats to be shared by disparate parts of the system 100, such as by translating and/or converting the data. The adapters allow external applications, such as the centralized catalog 115, to interact with the different systems catalogs 132, 134, and 136 to upload and/or update system catalogs 132, 134, and 136 uniformly, such as with information from the centralized catalog 115. In such a way, the system 100 may provide for the aligning catalog mapping tables, used during subscription inventory entity processing, according to end-to-end catalog design updates.

The system 100 may be used to automate configuration of the product and service catalog information on the customer relationship management (CRM) interface. The CRM may be implemented with specific software that allows a company to measure and control contacts with customers. CRM can be used for controlling contacts with a customer either by phone, fax, mail and e-mail. The data collected can be used for research and analysis of the customer relationship. The system enables a service provider, such as a telecommunications service provider, to have a normalized catalogue with management that is centralized with a dedicated server. The system 100 provides a way by which external applications, as the centralized product and service catalogue system, can interact with the CRM to upload or update their product and services catalogue according to a unified and centralized design. The system provides the ability to align catalogues, such as those used during subscription processing, according to end-to-end catalogue design updates.

Figure 2:
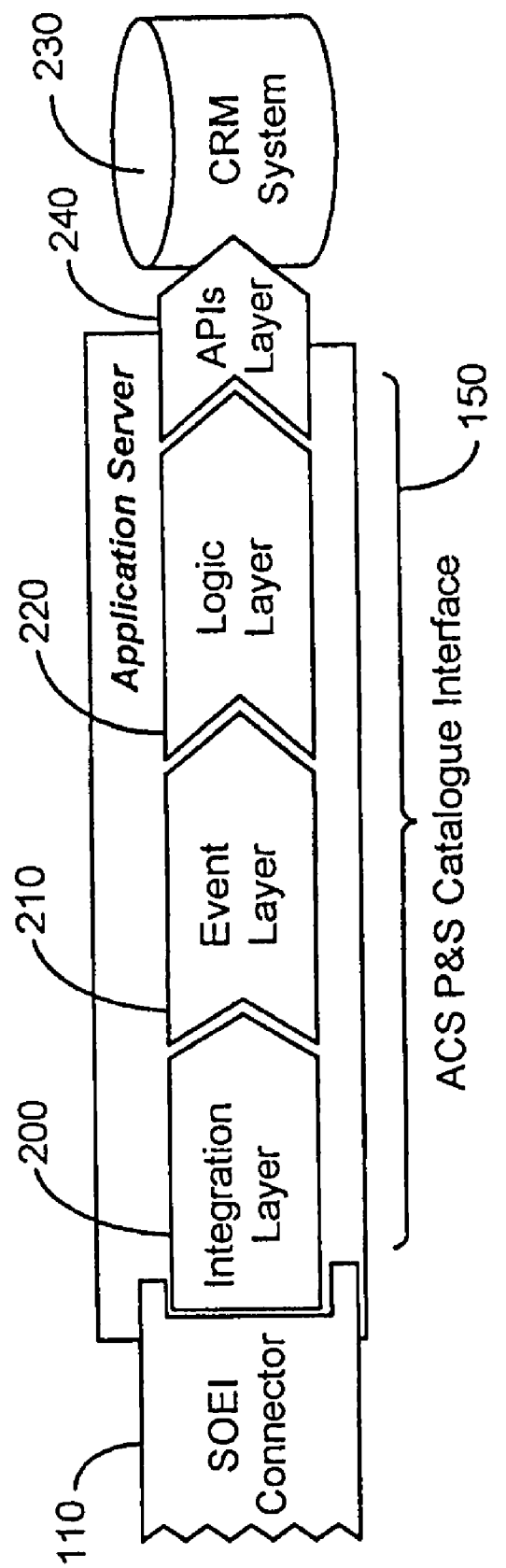
FIG. 2 is a block diagram of the adapter in more detail.

FIG. 2 is a block diagram of the adapter 150 in more detail. The adapters 150 may provide a set of component services and may be designed and built, for example, according to Service Oriented Architecture (SOA) principles. An SOA framework may provide patterns for design, development, deployment and management of a loosely coupled business application infrastructure. In this framework, business functionality may be published, discovered, and consumed as part of a business system of network and reusable technical and business services. In computing, the term SOA may express a perspective of software architecture that defines the use of loose coupled software services to support the requirements of the business processes and software users. In an SOA environment, resources on a network may be made available as independent services that can be accessed without knowledge of their underlying platform implementation. The services may be contract based and reusable.

The messaging interface system 100 may include layers that separate certain functionalities of the interface. For example, the adapter 150 may include an integration layer 200, an event layer 210 and a logic layer 220 and/or dedicated integration tables. The integration tables may enable the mapping of products stored in catalog views 140, 142 and 146, with the ones saved in system catalogs 132, 134 and 136. Each system catalog 132, 134 and 136 and centralized catalog 115 may store, maintain and manage its own product identifiers to leave the integration layer the task to map each other. The system 100 may be coupled with a product instance table for maintaining relationships between identifiers used to track products, services, and the like, in the various support systems of the architecture. The phrase "coupled with" may mean directly connected to or indirectly connected through one or more intermediate components.

The adapter 150 may connect to a database of a CRM system 230, via an application programming interface (API) layer 240 or other access service. The integration layer 200 may convert a message to a representation that conforms to a standard or common data model that is enforced across two or more of the systems and the architecture. The event layer 210 may include functions for transforming the standard or common data model representation into data types for use in a specific system of the architecture. The logic layer 220 may include logic for managing calls to system specific functions available through the API layer 240 offered by a specific system of the architecture. The API layer 240 may invoke these API functions to implement a message in the underlying support system of the architecture.

The system 100 may compose, orchestrate and/or map information to the data format as expected by the APIs. In doing this, the system 100 may help avoid the manual configuration of products and product attributes, services and service attributes, billing tariffs, rating tariffs, bundles, packages, contracts, promotions, discounts into a product and services catalog of the billing system. Additionally the system 100 may help avoid the manual configuration of bundles and packages, e.g., composite offerings of multiple product and services that are sold together as result of a specific marketing offering. This may reduce the lead time to roll-out a new offering, and enable feeding data by an external source to accommodate the centralized catalog 115, such as of products and services. The centralized catalog 115 may then be located externally to a specific application systems or a spreadsheet containing the required information.

The adapter 150 may leverage a web service technology, such as Web Services Description Language (WSDL). WSDL is an eXtensible Markup Language (XML) format for describing network services as a set of endpoints operating on messages containing either document-oriented or procedure-oriented information. The operations and messages may be described abstractly, and then bound to a concrete network protocol and message format to define an endpoint. Related concrete endpoints may be combined into abstract endpoints, e.g., services. WSDL may be extensible to allow description of endpoints and their messages regardless of what message formats or network protocols are used to communicate. It may consolidate earlier proposals in this area include Network Accessable Service Specification Language (NASSL), simple object access protocol (SOAP) Contract Language (SCL) and Service Description Language (SDL). SOAP requests, or request from another protocol for web service messages, may be used to connect the adapter 150 to back-end and legacy applications.

Figure 3:
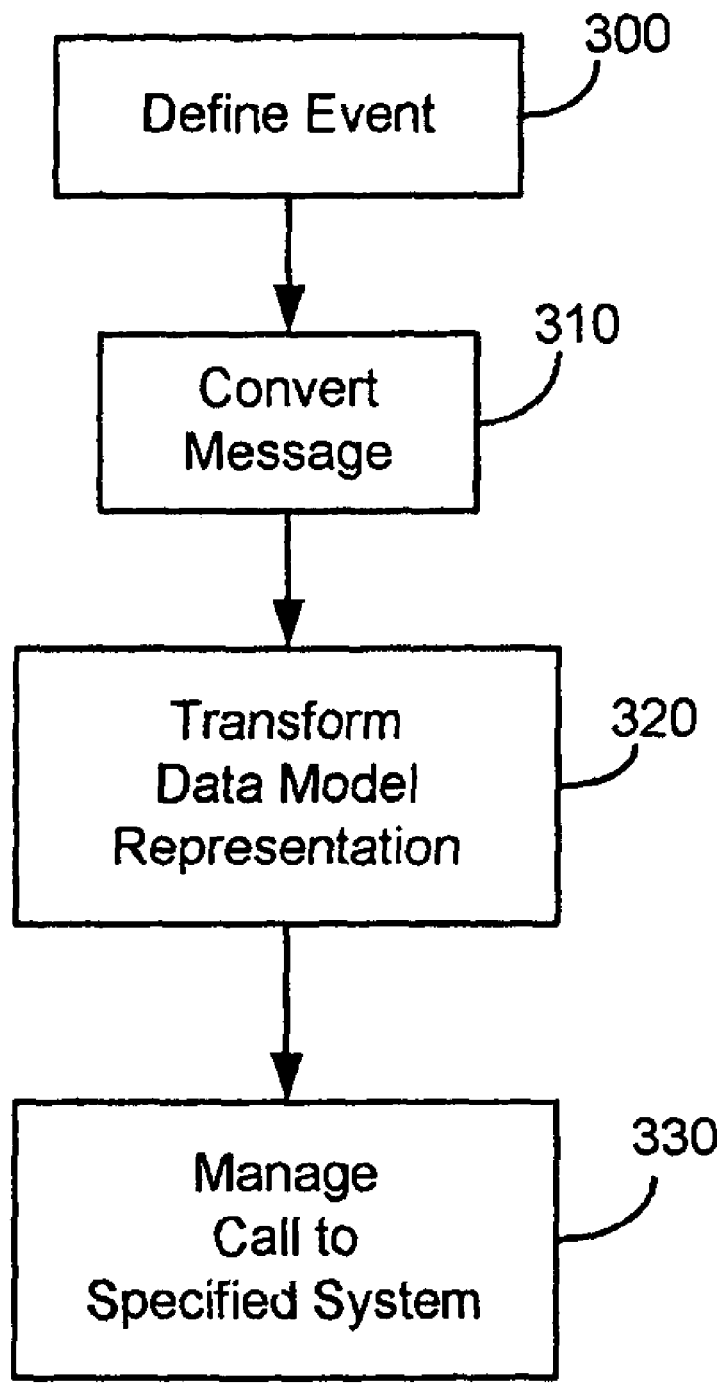
FIG. 3 is a flow chart of a logic of the messaging interface system.

FIG. 3 is a flow chart of a logic of the messaging interface system 100. At block 300, the message of the messaging interface system 100 may define an event, such as a request for the creation of product and service catalogue information such as for contracts in a customer care system. Multiple messages may be used to define a single event, or a single message may define multiple events. At block 310, the integration layer converts a message to a representation that conforms to a standard or common data model. At block 320, the event layer transforms the standard or common data model representation into data types for use in a specified system of the architecture. At block 330, the logic layer manages calls to the specified system. In such a way, the message interface system 100 may supply information to a support system such as the customer care system 132. For instance, block 330 can call a specific service exposed through the API layer 240 by system catalog 132 to create, update or modify a product structure. Between block 330 and the API layer 240, a logic could be managed to handle errors.

Figure 4:
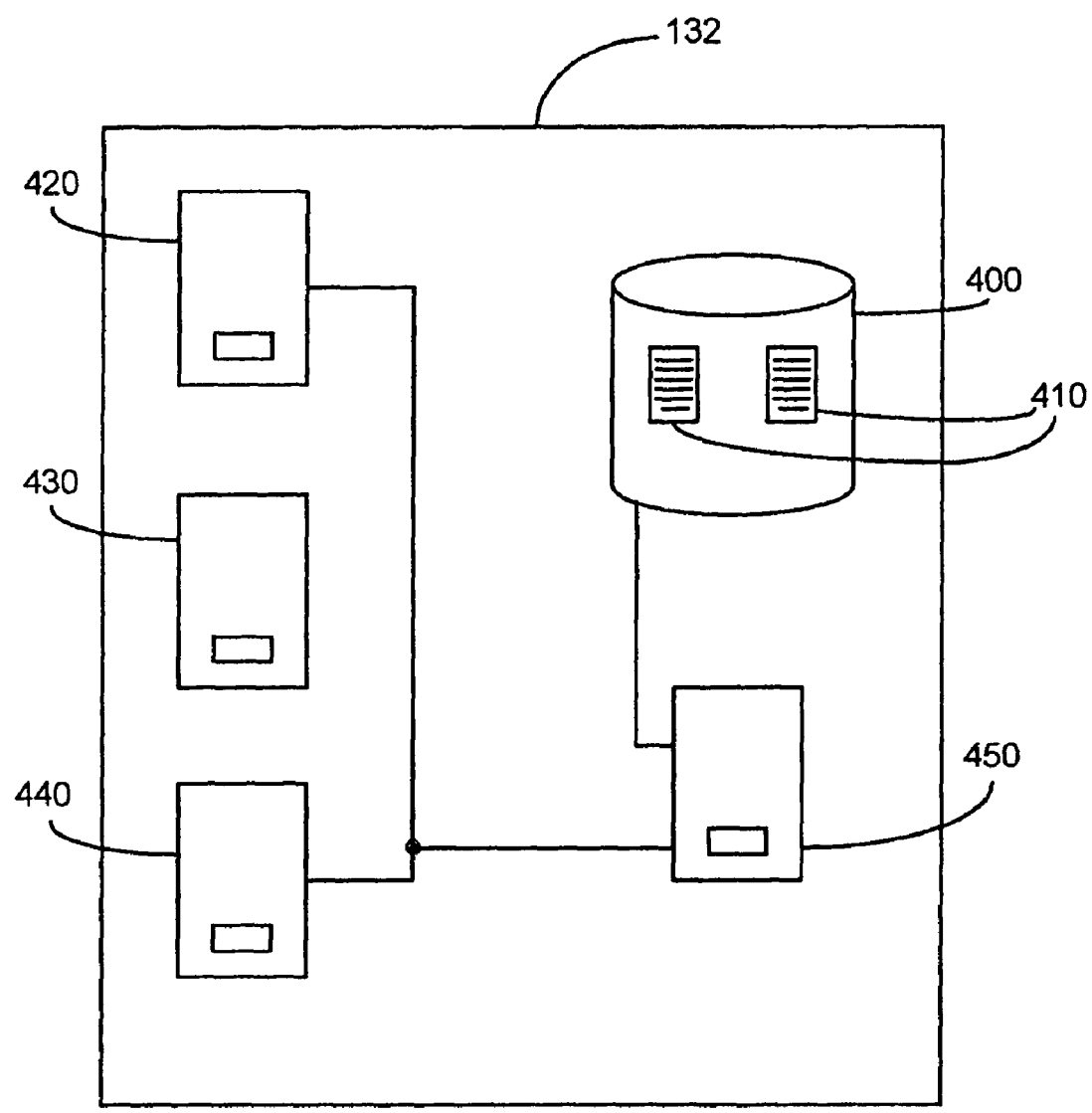
FIG. 4 is a block diagram of an exemplary customer care system.

FIG. 4 is a block diagram of an exemplary customer care system 132. The customer care system 132 includes a database 400 that may include a plurality of product catalogue database tables 410 for storing product data. A web and application server 420 may be included that manage interfaces to import products related data. A web client 430 may display the products data generated by the web and application server interfaces, which may enable a user to complete product configurations. A gateway server 440 may communicate data and commands between the web server 420 and a database server 450. Tools may be included to configure the physical and logical objects required use by the integration layer 200 to import product data.

The information may be stored in the customer care system database 400 according to a data model associated with the customer care system. The customer care system may include hardware and software supporting logic which processes customer care action requests. The support logic in the customer care system may be implemented with commercially available customer care software package, such as Oracle Siebel™ application. In some implementations, the communication interfaces may be network sockets defined by IP addresses, port numbers, and communication protocols. The messages may travel between the systems according to a variety of protocols and integration technologies, including BEA Aqualogic™, BEA WLI™, Tibco™ Rendezvous, Microsoft Biz- Talk™, IBM MQseries™, Vitria™, Java Message Service protocol, Simple Object Access Protocol (SOAP), or HTTP. In other implementations, the systems may communicate via inter-process communication, messaging, or signaling.

The adapters 150 may be provided between the external source of data which could act as a centralized product and service catalogue and the message routing system, as well as between the messaging interface and the support systems. The adapters 150 may support transformation of the messages and/or message content from a format defined by one schema, e.g., a schema for messages to adhere to a specific customer care system, to another format determined by another schema, e.g., a schema for messages to adhere to in the messaging interface and/or support systems.

In one implementation, the messages may contain data described by eXtensible Markup Language (XML) tags and the adapters perform transformation according to eXtensible Stylesheet Language for Transformations (XSLT) stylesheets. The transformations may transform data between schemas for any of XML, Web Service Definition Language (WSDL), eXtensible Scheme Diagram (XSD), as examples. The messages may move between systems using any type of transportation or data access protocol, including HTTP, SOAP, or other protocols in place at the customer care management system, messaging interface, and/or support systems. The architecture may also support multiple different reply messages, such as a reply message for each supported event. Alternatively, or additionally, standard reply messages may be used to respond to multiple events. Any other messages or events may be used.

The messaging interface system 100 may support various types of messages. For example, the interface may support messages that define products and product attributes, services and service attributes, billing tariffs, rating tariffs, bundles, packages, contracts, and promotions. Other types of supported messages may include discount related events for handling product level data, messages that define services related events for handling services level data, messages that define contracts related events for handling contracts level data, and messages that define promotions related events for handling promotions level data. Other messages include messages that define discounts related events for handling discounts level data, messages that define billing tariffs related events for handling billing tariffs level data, and messages that define rating tariffs related events for handling rating tariffs level data. The messaging interface may support other types of events, such as events that specify the compatibility between products, the eligibility roles to buy a specific product, the price list upgrade and down grade compatibility.

The messaging interface system 100 to automate product and service catalogue information into the customer care system may also implement the logic required to feed the mapping table with the product and service catalogue information included into the external messaging interface. The messaging interface system may create and modify subscription information during the operation of telecommunications processing ecosystem. The mapping table configuration typically otherwise requires manual work to be done directly into the table.

Figure 5:
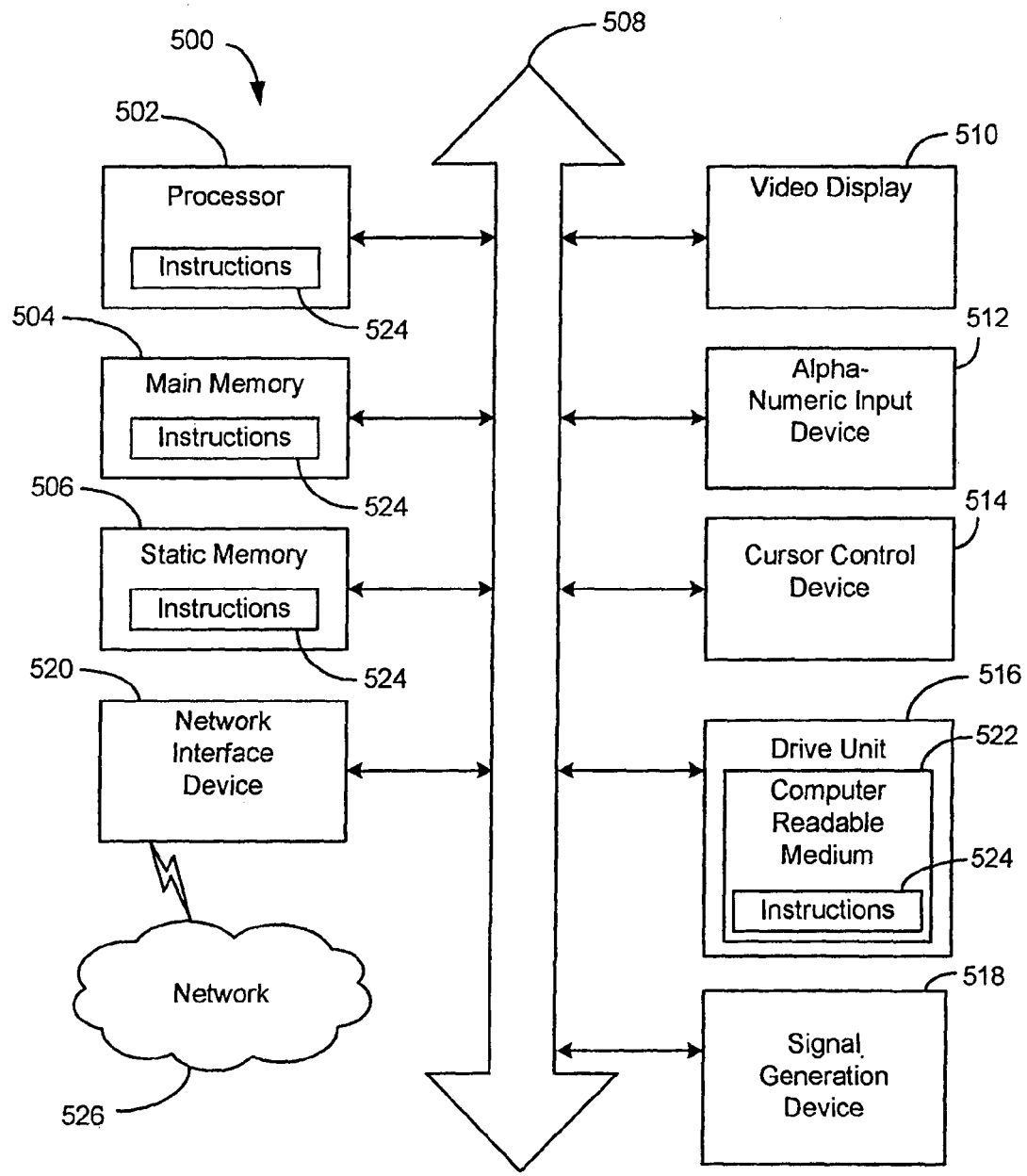
FIG. 5 is a block diagram of an exemplary general computer system that may be used with to implement the messaging interface system.

FIG. 5 is a block diagram of an exemplary general computer system 500 that may be used with to implement the messaging interface system 100. The computer system 500 may include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. The tool may be implemented hardware, software or firmware, or any combination thereof. Alternative software implementations may be used including, but not limited to, distributed processing or component/object distributed processing, parallel processing, or virtual machine processing may also be constructed to implement the tools described herein.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing a set of instructions (sequential or otherwise) that specify actions to be taken by that machine. The computer system 500 may be implemented using electronic devices that provide voice, video or data communication. Further, while a single computer system 500 is illustrated, the term "system" shall also be taken to include any collection of systems or subsystems that individually or jointly execute a set, or multiple sets, of instructions to perform one or more computer functions.

The computer system 500 may include a processor 502, e.g., a central processing unit (CPU), a graphics processing unit (GPU), or both. Moreover, the computer system 500 may include a main memory 504 and a static memory 506 that may communicate with each other via a bus 508. The computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 may also include a disk drive unit 516, a signal generation device 518, such as a speaker or remote control, and a network interface device 520.

The disk drive unit 516 may include a computer-readable medium 522 in which one or more sets of instructions 524, e.g. software, may be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

Dedicated hardware implementations, such as application specific integrated circuits, programmable logic arrays and other hardware devices, may be constructed to implement one or more of the tools described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit.

The present disclosure contemplates a computer-readable medium that includes instructions 524 or receives and executes instructions 524 responsive to a propagated signal, so that a device connected to a network 526 may communicate voice, video or data over the network 526. Further, the instructions 524 may be transmitted or received over the network 526 via the network interface device 520. While the computer-readable medium is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding or carrying a set of instructions for execution by a processor or that cause a computer system to perform any one or more of the methods or operations disclosed herein.

The computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

While various embodiments of the invention have been described, it will be apparent to those of ordinary skill in the art that many more embodiments and implementations are possible within the scope of the invention. Accordingly, the invention is not to be restricted except in light of the attached claims and their equivalents. It should be understood that the computer program product of the invention may be particularly embodied in a computer-readable storage medium, as a signal or data stream.

We claim:

1. A method to implement a messaging interface system for serving a message to a target system, comprising:
    converting, by an integration layer, with a processor, a database message to a common data model to conform to at least two systems and an architecture of the target system;
    transforming by an event layer the common data model into a specified data type of the architecture of the target system;
    managing by a logic layer calls using specified functions available through an application programming interface offered by the architecture of the target system, the application programming interface layer invoking application programming interface functions to implement a message in an underlying support system of the architecture;
    invoking functions of the application programming interface to implement a target message in the architecture of the target system; and
    writing the message to the target system;
    where the database message is stored in a central catalog, the central catalog comprises a plurality of different catalog views, where each catalog view is an extract from the central catalog tailored for a specific system application domain;
    where an adapter is provided for each catalog view, where each adapter accommodates transfer of information from the catalog view to a related system catalog;
    where each adapter includes an integration table which enables mapping of products stored in the catalog views with the ones saved in the system catalogs, wherein each system catalog and centralized catalog store, maintain, and mange its own product identifiers; and
    where the messaging interface system is coupled with a product instance table for maintaining relationships between identifiers used to track products for services in the support system of the architecture.

2. The method of claim 1, wherein the database message comprises an XML message.

3. The method of claim 1, wherein the target system comprises at least one of a customer care system catalog, a rating and billing system catalog, and an integrated order management system catalog.

4. The method of claim 1, wherein the integration layer further establishes a connection with the target system.

5. The method of claim 1, wherein the database messages comprise products, product attributes, services, service attributes, billing tariffs, rating tariffs, bundles, packages, contracts, promotions, and discounts.

6. A system for serving a message to a target system, comprising:
    a processor;
    a memory connected to said processor;
    a first database that stores a central catalog containing catalog entities, wherein the catalog entities from the central catalog are sent in the form of a data message, where the central catalog comprises a plurality of catalog views, and where each catalog view is an extract from the central catalog tailored for a specific system application domain;
    a second database for stores data structures of the target system; and
    an adapter that manages data offerings from the first database to the second database, the adapter including:
        an integration table which enables mapping of products stored in the catalog views with the ones saved in the system catalogs, where each system catalog and centralized catalog store, maintain, and manage its own product identifiers;
    where the system is coupled with a product instance table that maintains relationships between the identifiers used to track products or services in support systems of the architecture;
    an integration layer converting a database message to a representation that conforms to a standard data model that is enforced across two or more systems and the architecture;
        an event layer including functions that transforms the standard data model representation into data types for use in a specific system of the architecture; and
        a logic layer including logic that manages calls to system specific functions available through an application programming interface layer offered by a specific system of the architecture, the application programming interface layer invoking application programming interface functions to implement a message in an underlying support system of the architecture;
    where the adapter comprises a plurality of adapters, one for each catalog view of where each adapter accommodates the transfer of information from a catalog view to a related system catalog.

7. The system of claim 6, wherein the data message comprises an XML message.

8. The system of claim 6, wherein the target system comprises at least one of a customer care system catalog, a rating and billing system catalog, and an integrated order management system catalog.

9. The system of claim 6, wherein the database message comprises at least one of a product attribute, a service attribute, a billing tariff, a rating tariff, a contract, a promotion, and a discount.

10. The system of claim 6, wherein the logic layer comprises a business logic layer.

11. The system of claim 6, wherein the central catalog comprises a commercial catalog view, a rating and billing catalog view, a technical catalog view, and a catalog database.

* * * * *